(12) United States Patent
Martin et al.

(10) Patent No.: US 9,555,716 B2
(45) Date of Patent: Jan. 31, 2017

(54) AUTOMOTIVE VEHICLE CHARGE SYSTEM

(75) Inventors: Douglas Raymond Martin, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1035 days.

(21) Appl. No.: 13/426,121

(22) Filed: Mar. 21, 2012

(65) Prior Publication Data
US 2013/0249470 A1 Sep. 26, 2013

(51) Int. Cl.
*H02J 7/00* (2006.01)
*B60L 11/18* (2006.01)

(52) U.S. Cl.
CPC .......... *B60L 11/182* (2013.01); *B60L 11/1824* (2013.01); *B60L 11/1833* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ...................................... B60M 7/003
USPC .................. 320/107–109; 700/286
See application file for complete search history.

(56) References Cited

U.S. PATENT DOCUMENTS

| 5,617,003 | A | | 4/1997 | Odachi et al. | |
|---|---|---|---|---|---|
| 5,654,621 | A | * | 8/1997 | Seelig | ............................ 320/108 |
| 5,821,731 | A | * | 10/1998 | Kuki | ................... B60L 11/1805 320/108 |
| 6,297,905 | B1 | * | 10/2001 | Takamoto | .............. G03B 21/58 359/443 |
| 2007/0131505 | A1 | | 6/2007 | Kim | |
| 2010/0235006 | A1 | * | 9/2010 | Brown | .......................... 700/286 |
| 2011/0181240 | A1 | * | 7/2011 | Baarman | ............... B60L 11/182 320/108 |

FOREIGN PATENT DOCUMENTS

| EP | 1205340 A1 | 5/2002 |
|---|---|---|
| FR | 2740921 A1 | 5/2007 |
| GB | 2352886 A | 2/2001 |

(Continued)

OTHER PUBLICATIONS

Ovidiu, "Evatran's Wireless EV Charger: Lower Efficiency for Sake of Comfort?", http://www.greenoptimistic.com/2009/12/22/evatrans-wireless-ev-charger-lower-efficiency-for-sake-of-comfort, Dec. 22, 2009, 3 Pages.

*Primary Examiner* — Drew A Dunn
*Assistant Examiner* — Zixuan Zhou
(74) *Attorney, Agent, or Firm* — David B. Kelley; Brooks Kushman P.C.

(57) ABSTRACT

A vehicle charging system includes a base plate having an inclined surface defining at least a portion of a recess, and an arm arrangement having a base end portion movably attached to the base plate, a vehicle end portion, a spring-loaded element attached to the base end portion and in contact with the base plate, and a primary charge pad attached to the vehicle end portion. The arm arrangement has a retracted position in which at least a portion of the primary charge pad is disposed within the recess and an extended position in which the primary charge pad is spaced away from the base plate. The spring-loaded element is arranged to move along the inclined surface as the arm arrangement moves between the retracted and extended positions.

16 Claims, 7 Drawing Sheets

(56) References Cited

FOREIGN PATENT DOCUMENTS

| WO | 2002063742 | A1 | 8/2002 |
|----|------------|----|--------|
| WO | 2006133074 | A2 | 12/2006 |
| WO | 2010006078 | A1 | 1/2010 |

* cited by examiner

AUTOMOTIVE VEHICLE CHARGE SYSTEM

TECHNICAL FIELD

This disclosure relates to inductive chargers for automotive vehicle batteries.

BACKGROUND

Electric vehicles are charged with charging mechanisms. Certain charging mechanisms can include a docking station which is aligned with and connected to a corresponding vehicle port to facilitate charging. Other charging mechanism can include a charge coil that is aligned with a corresponding charge coil on a vehicle. These charge coils need not be in direct contact to facilitate charging.

SUMMARY

A vehicle charging system includes a primary charge pad, a base including an inclined surface defining at least a portion of a recess, and an arm arrangement movably attached with the base and the primary charge pad. The arm arrangement includes a spring-loaded element in contact with the base. The arm arrangement has a retracted position in which at least a portion of the primary charge pad is disposed within the recess and an extended position in which the primary charge pad is spaced away from the base. The spring-loaded element is arranged to move along the inclined surface as the arm arrangement moves between the retracted and extended positions.

DETAILED DESCRIPTION

Embodiments of the present disclosure are described herein; however, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
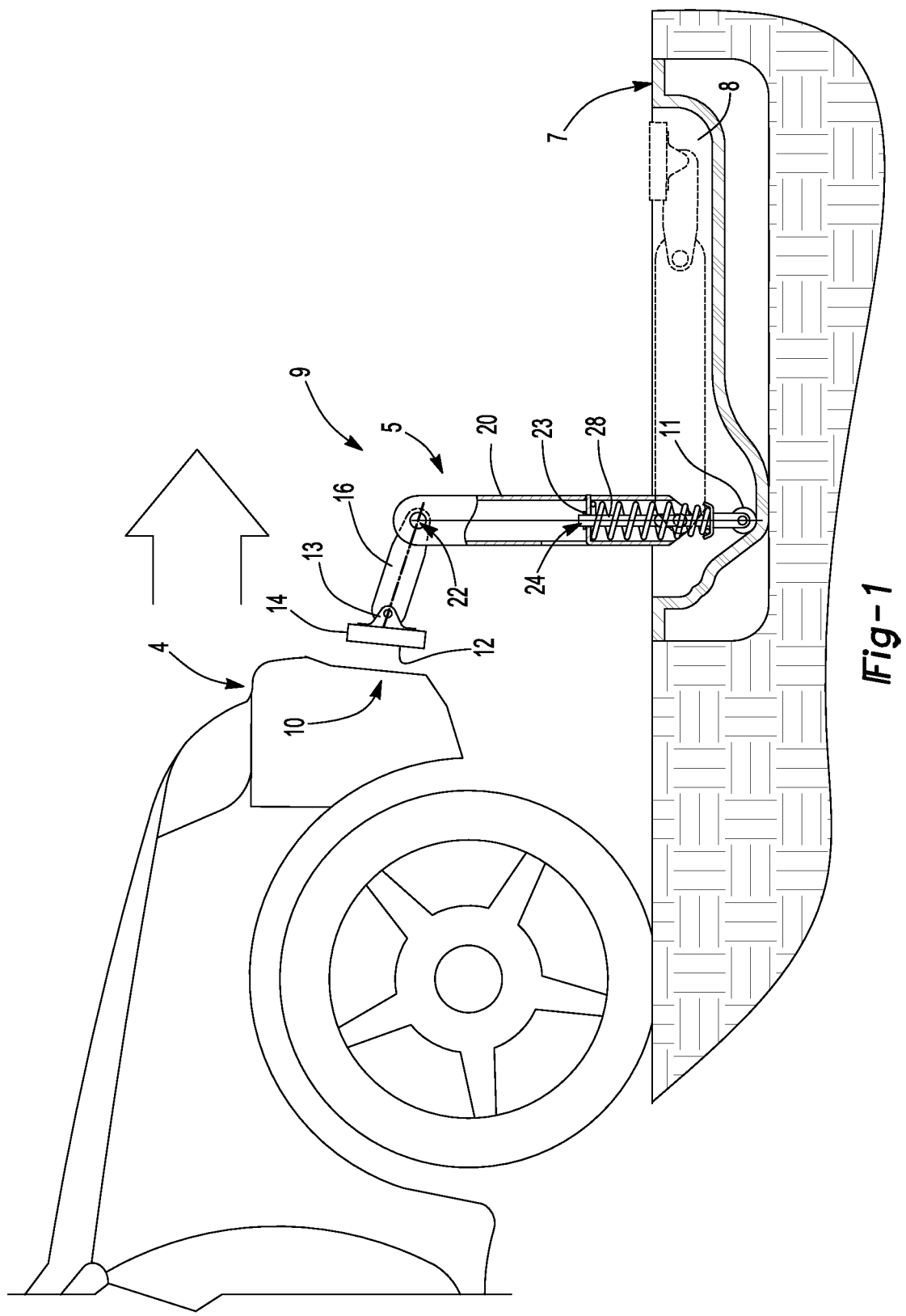
FIG. 1 is a side view, in partial cross-section, of an inductive charging system and automotive vehicle.

FIG. 1 is a side view, in partial cross section, of a charging station 9. The charging station 9 is connected to a ground mount 7. The ground mount 7 can be fashioned from any suitable material. The ground mount (base plate) 7 is a fixture in a car garage or a parking area. The ground mount 7 can be permanently fixed (not shown) directly into the ground. The ground mount 7 defines a recess 8. The charging station 9 incorporates an arm arrangement 5 affixed to the ground mount 7 with a ball-roller 11. The arm arrangement 5 includes an alignment arm 16 and a vertical pole 20.

Further referring to FIG. 1, a secondary charging coil 10 may be located on a front vehicle bumper 4. The secondary charging coil 10, however, can be placed anywhere on the vehicle. A primary charging coil 12 is located on the charging station 9. The primary charging coil 12 is embedded in a primary-coil pad 14, which is connected to the arm arrangement 5. A female end of a pivot connector 13 can be located on the primary coil pad 14, while a male connector may be attached to the alignment arm 16. The pivot connector 13 allows the primary-coil pad 14 to actuate circumferentially, allowing for the same charging station 9 to accommodate many vehicles of different sizes and shapes.

The primary coil pad 14 will also allow for more efficient coupling with the secondary charging coil 10 because the angle of the primary coil pad 14 can be moved to accommodate optimal coupling between the two charging coils. After receiving current from the primary charging coil 12, the secondary charging coil 10 charges a vehicle battery (not shown) in a plug-in hybrid electric vehicle (PHEV) or a battery electric vehicle (BEV).

In the past, batteries for hybrid and photo-electric vehicles were charged using a plug-in system. These plug-in systems could have contributed to "drive off" issues in which the driver drove the vehicle while the system was plugged into a wall outlet. The charging station 9, in FIG. 1, automatically decouples from the secondary charging coil 10 in the event of a "drive-off", leaving both the charging station 9 and the vehicle unaffected.

The alignment arm 5 includes vertical pole 20 with a hinge connector on an elbow joint 22. The hinge connector on the elbow joint 22 allows for the alignment arm 16 to pivot about the vertical pole 20, adjusting for various vehicle heights and positions.

The vertical pole 20 is held upright by a spring mount 24 that is affixed to the ground mount 7 with spring mount pins 23. Inside the vertical pole 20, there is a spring rod 28 that connects to the spring mount 24. The vertical pole 20 can be a metal rod, hollowed out on the inside. The spring rod 28, on the top, is secured to the vertical pole 20.

Figure 2:
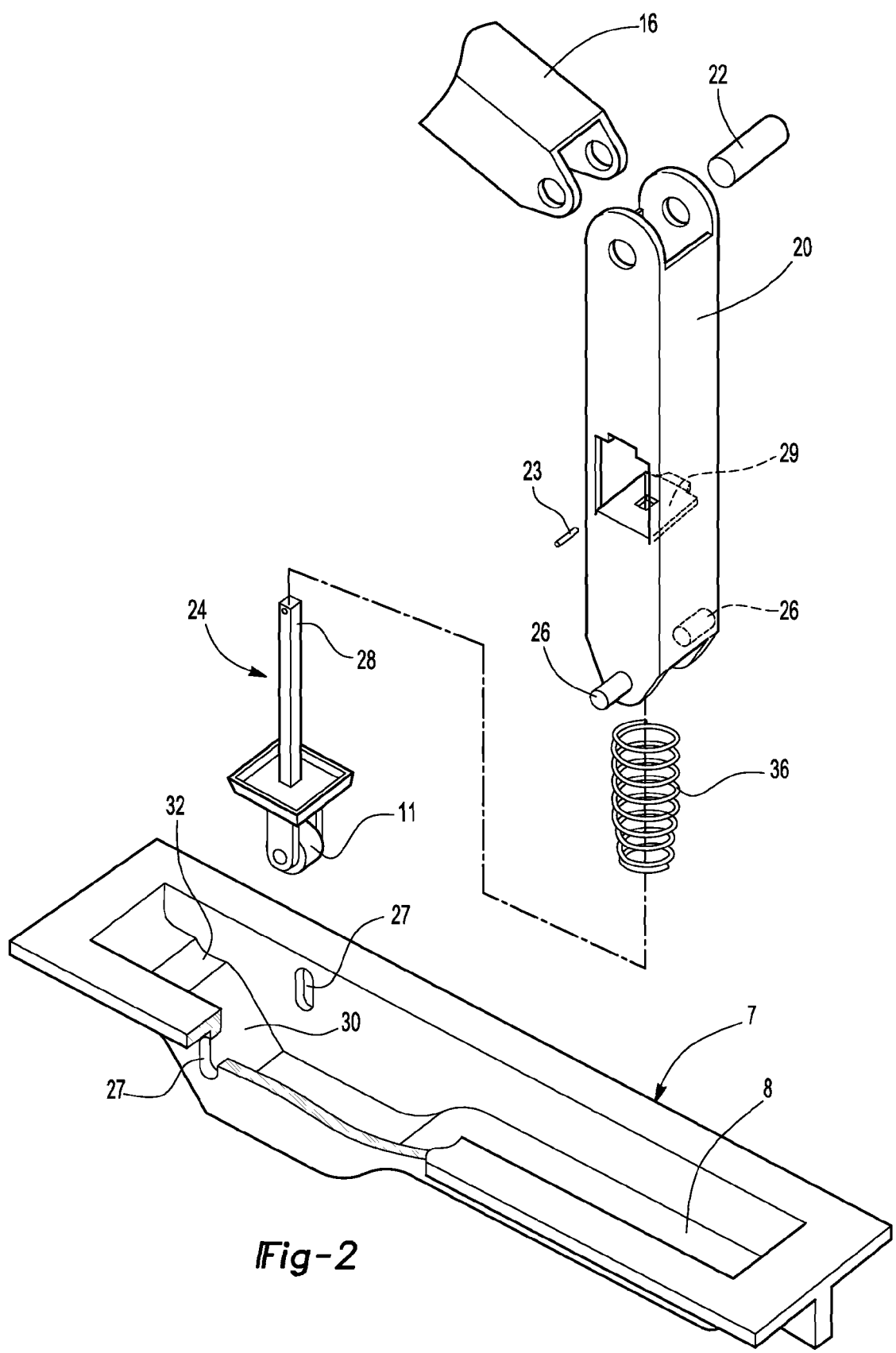
FIG. 2 is an exploded assembly view of a portion of the inductive charging system of FIG. 1.

FIG. 2 is an exploded view of the vertical pole assembly. The vertical pole 20 is secured into the ground mount 7 with a set of round pins 26 inserted into a set of pin slots 27. This prevents the vertical pole 20 from being removed from the ground mount 7 assembly. The ball-roller 11 rests underneath an incline slope 30. The ball-roller 11 is attached to the spring mount 24. The spring mount 24 secures the spring rod 28 into place. The spring rod 28 attaches to the vertical pole 20 on a spring plate 29. The spring rod 28 attaches to the spring plate 29 with the use of the set of spring mount pins 23. An over-center spring coil 36 is loaded onto the spring rod 28. The spring rod 28 is also connected to the spring plate 29. The spring plate 29 keeps the over-center spring coil 36 in a compressed state when the vertical pole 20 is in the upright position. When the over-center spring coil 36 is stretched, it is forced to compress again, and thereby the over-center spring coil 36 aids the vertical pole 20 in returning to the upright position. The ground mount 7 includes the incline slope 30 and a concavity 32. The recess 8 is shaped to receive the vertical pole 20 and alignment arm 16.

Figure 3:
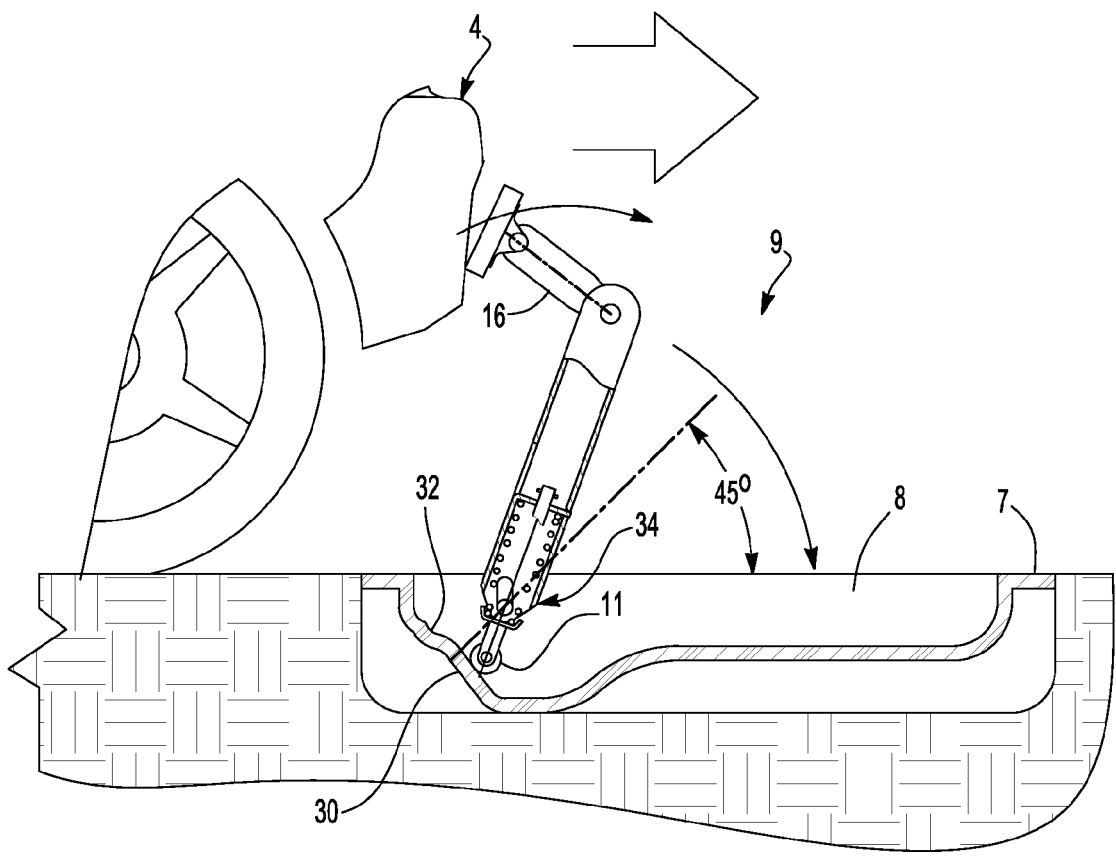
FIGS. 3-6 are side views, in partial cross-section, of the inductive charging system of FIG. 1 during and after a collision with the automotive vehicle.

FIGS. 3-6 show the sequence as the vertical pole falls into the recess 8 after an impact with an automobile. Referring to FIG. 3, the ball-roller 11 is on a slider joint 34 that is located on the incline slope 30. At the apex of the incline slope 30, the concavity 32 is molded to hold the ball-roller 11. The incline slope 30 is sloped for a particular tolerance. In this particular situation, it is a tolerance of 45 degrees. If a vehicle bumper 4 collides with the charging station 9, and the collision causes the vertical pole 20 to pivot less than 45 degrees, the vertical pole 20 travels up the incline slope 30 and immediately slides down the incline slope 30, returning to its upright position.

Conventional charging systems can include dock chargers. These dock chargers, however, require precise alignment for proper operation. Some drivers lack the skill required for such precise positioning. Moreover, if the driver misses the position of the charging dock and collides with the dock, the charging dock could be damaged.

Figure 6:
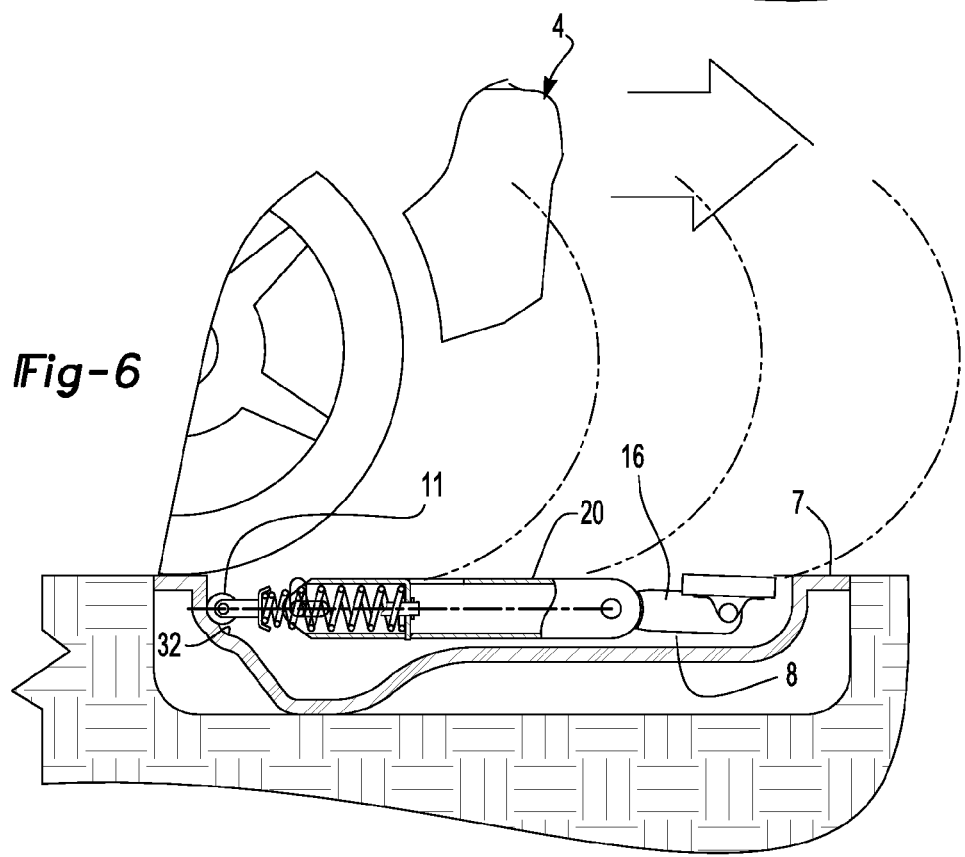

Referring to FIG. 6, in an event of a collision with an automobile, the vertical pole 20 is configured to move backwards and fall into the ground mount 7 where a recess is located. During this process, the angular momentum of the vertical pole 20 can cause the alignment arm 16 to swing around and lie parallel to the vertical pole 20. The ground mount 7 absorbs the impact of the vertical inductive charger. The automobile can then drive over of the fallen vertical pole 20 without damaging the vertical pole 20.

Figure 4:
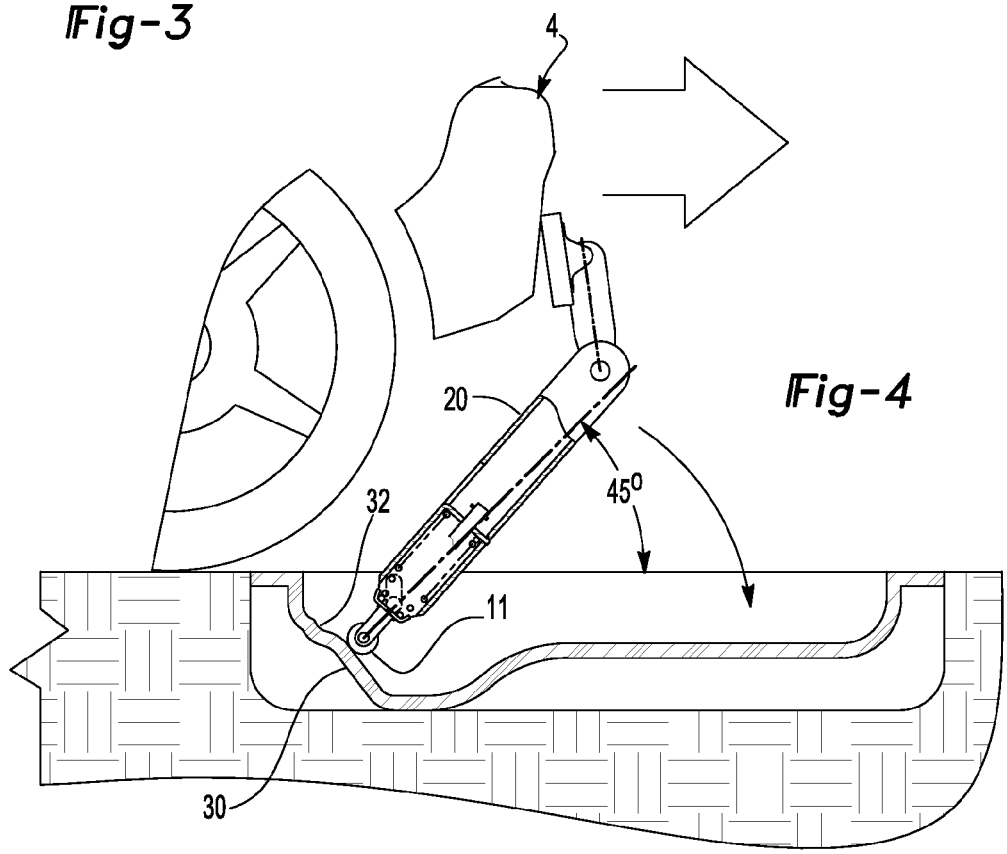

Referring to FIG. 4, the vehicle bumper 4 collides with the vertical pole 20 causing the vertical pole 20 to tilt at an angle greater than 45 degrees. The ball-roller 11 travels up the incline slope 30 and falls into the concavity 32. The ball-roller 11 does not travel back down the incline slope 30 as the concavity 32 has a hollowed shape to prevent the ball-roller 11 from rolling down the slope 30. This also ensures that after a first collision with the charging station 9, the vertical pole 20 does not stand back up to permit further collisions.

Figure 5:
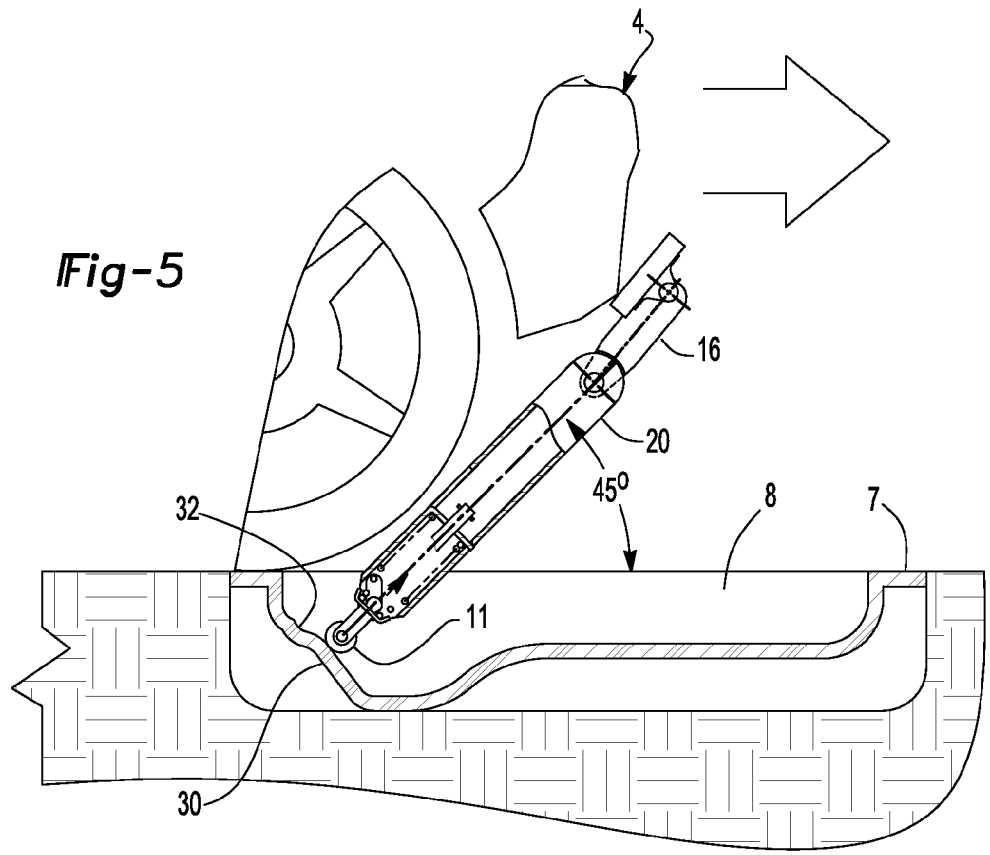

Referring to FIG. 5, after the vehicle bumper 4 collides with the vertical pole 20, the alignment arm 16 pivots to a position where it is at a 180° angle with the vertical pole 20. Furthermore, the angular momentum of the alignment arm 16 retracting towards the ground mount 7 further pushes the ball-roller 11 up the incline slope 30 and into the concavity 32. This prevents the vertical pole 20 from sliding back down the incline slope 30.

Although, a ball-roller 11 is used to move the vertical pole 20 through the incline slope 30, the ball-roller 11 may be substituted with other mechanisms to allow for movement through the incline slope 30. For example, a slider attached to an incline may also be used for the same function.

Another alternative for allowing the same functionality may be having the vertical pole 20 connected to the ground on a hinge connector which may be loaded with springs. When the springs stretch to one point, the force on the springs will push the vertical pole 20 back to the upright position. The ground behind the vertical pole could still contain the recess 8 to allow for the vertical pole to fall into it.

Referring to FIG. 6, after the ball-roller 11 is in the concavity 32, the force on the alignment arm 16 causes the vertical pole 20 to fall into the recess 8. The recess 8 is shaped in such a way that it absorbs the impact of the fall. If the vehicle were to drive over the vertical charger, it would be undamaged as the ground mount 7 would absorb the force.

Figure 7:
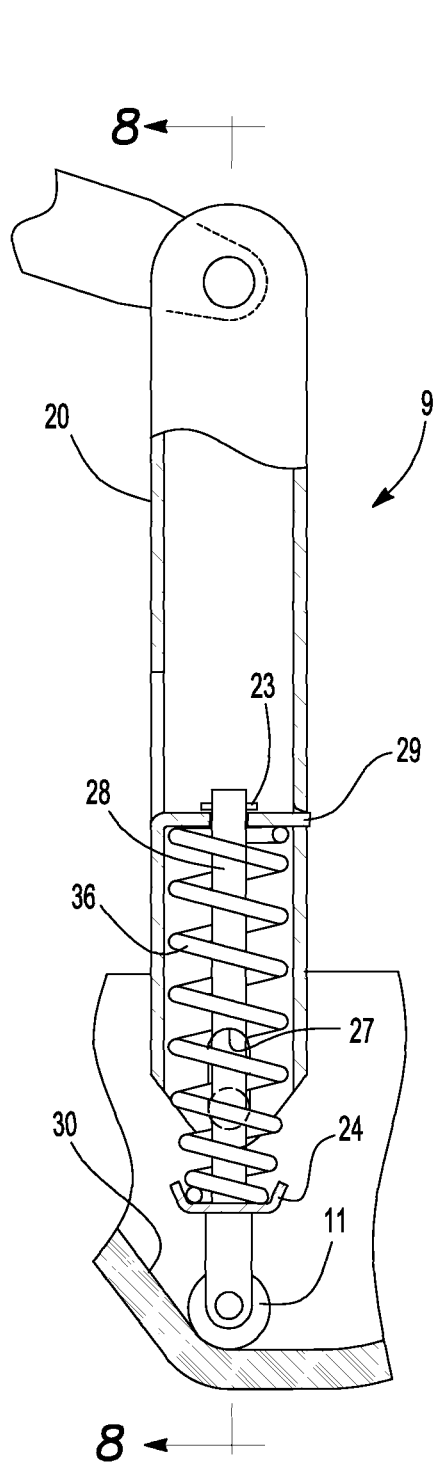
FIG. 7 is a side view, in partial cross-section, of the inductive charging system of FIG. 1.

FIG. 7 is a partial side view of the vertical pole 20 equipped with the spring mount 24. The spring rod 28 is connected to the ball-roller 11 with a hinge. The over-center spring coil 36 is wrapped around the spring rod 28. The spring rod 28 is secured in place with the spring mount pin 23. The ball-roller 11 rests beneath the incline slope 30.

Figure 8:
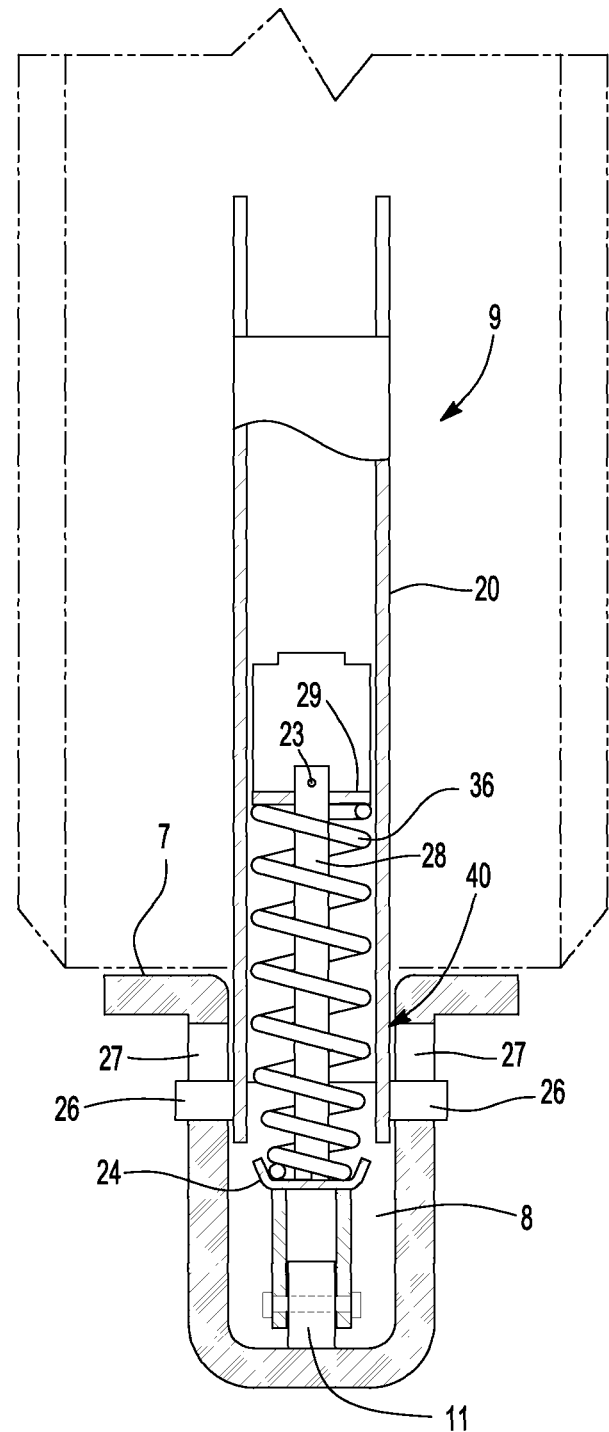
FIG. 8 is a front view, in partial cross-section, of the portion of the inductive charging system of FIG. 7.

FIG. 8 is a partial front view of the vertical pole 20 equipped with the spring mount 24. The vertical pole 20 is restricted to one degree of freedom of movement with a pair of slide rails 40. The slide rails 40 are attached to the vertical pole 20 with a hinge slot (see FIG. 2). The slide rails 40 prevent the vertical pole 20 from falling in other directions. This ensures that the vertical pole 20 falls onto the recess 8, thereby preventing the charging station 9 from being damaged in events of collisions.

Although in this embodiment an over-center spring coil 36 is used to keep the alignment arm 16 upright, other possible methods can be used to keep the alignment arm upright. For example, the alignment arm 16 can be connected to a slider joint using a piston. The piston can compress, sending the slider joint backwards, and may retract the height of the alignment arm. After a certain compression, the piston can also collapse allowing the alignment arm 16 to fall into the ground mount 7.

Figure 9:
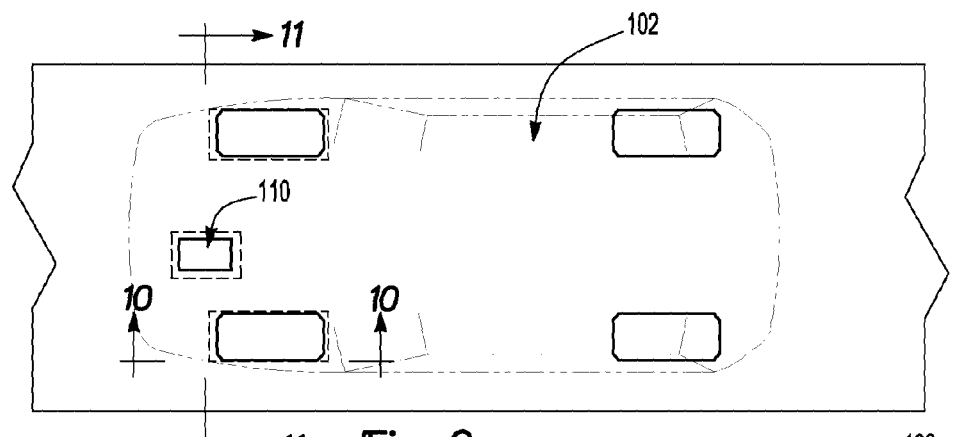
FIG. 9 is a bottom view of an automotive vehicle equipped with an underbody inductive charger.

FIG. 9 refers to an alternate embodiment where the system is equipped with an underbody charger. A vehicle 102 is equipped with a secondary charging coil 110. The secondary inductive coil 110 may be located on the bottom of the vehicle 102.

Figure 10:
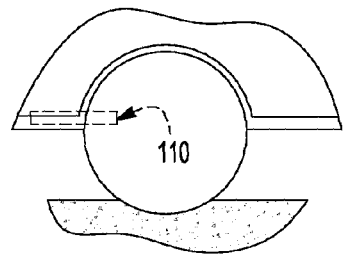
FIG. 10 is side view of the underbody inductive charger of FIG. 9.

FIG. 10 is a side view of the car tire driving over the underbody charging station. An underbody charging station 109 (see FIG. 11) is affixed to the ground. When the car tire drives over the under body charging station 109, the under body charging station 109 retracts to be flush with the ground. The underbody charging station 109 automatically decouples from the secondary charging coil 110 in the event of a "drive-off".

Figure 11:
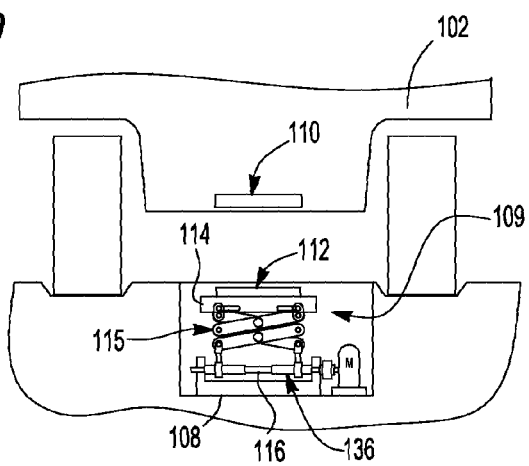
FIG. 11 is a front view of the underbody inductive charger of FIG. 9 and associated charging station retracted into the ground.

FIG. 11 is a front view of the underbody charging station retracted into the ground. In this particular embodiment, the vehicle 102 is currently stationed over the parking spot. The secondary inductive coil 110 may be located beneath the vehicle. When the underbody charging station 109 is in its retracted position, it is flush with the ground. The underbody charging station 109 carries a primary charging coil 112. A primary coil pad 114 may be connected to a scissor lift 115. The scissor lift 115 can elevate the primary charging coil 112 to many different positions. This allows for the same underbody charging station 109 to be used on many different automobiles having varying heights. The scissor lift 115 is connected to an alignment rod 116. The alignment rod 116 has a spring coil 136 threaded on it. The spring coil 136 allows for the scissor lift 115 to move horizontally to better couple with the secondary charging coil 110. The alignment rod 116 is connected to a ground mount 108. The ground mount 108 secures the underbody charging station 109 into the parking spot or a car garage.

Figure 12:
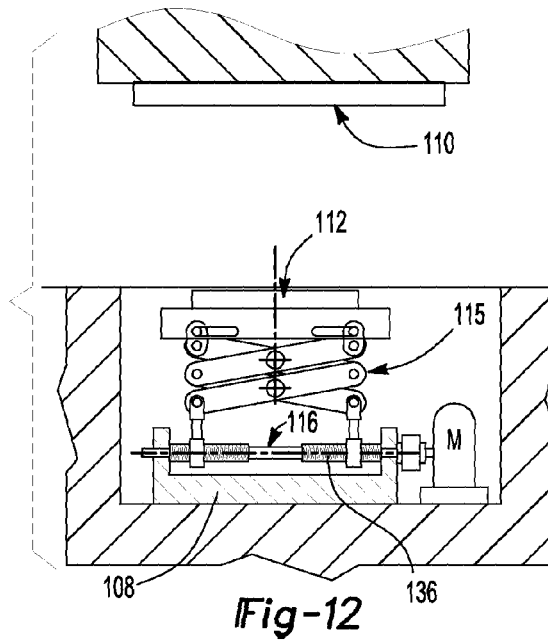
FIGS. 12 and 13 are side views of the charging station of FIG. 11 in retracted and extended positions respectively.
Figure 13:
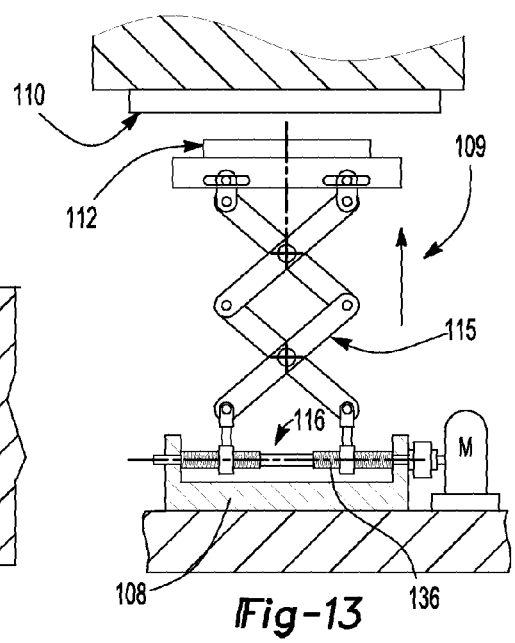

FIGS. 12-13 show the underbody charging station lifting up to couple with the secondary inductive coil. FIG. 12 depicts the underbody charger in its retracted position. The scissor lift 115 is in its retracted position. FIG. 13 depicts the under body charger 109 in its raised position. The scissor lift 115 is in its elevated position.

Figures 14, 15:
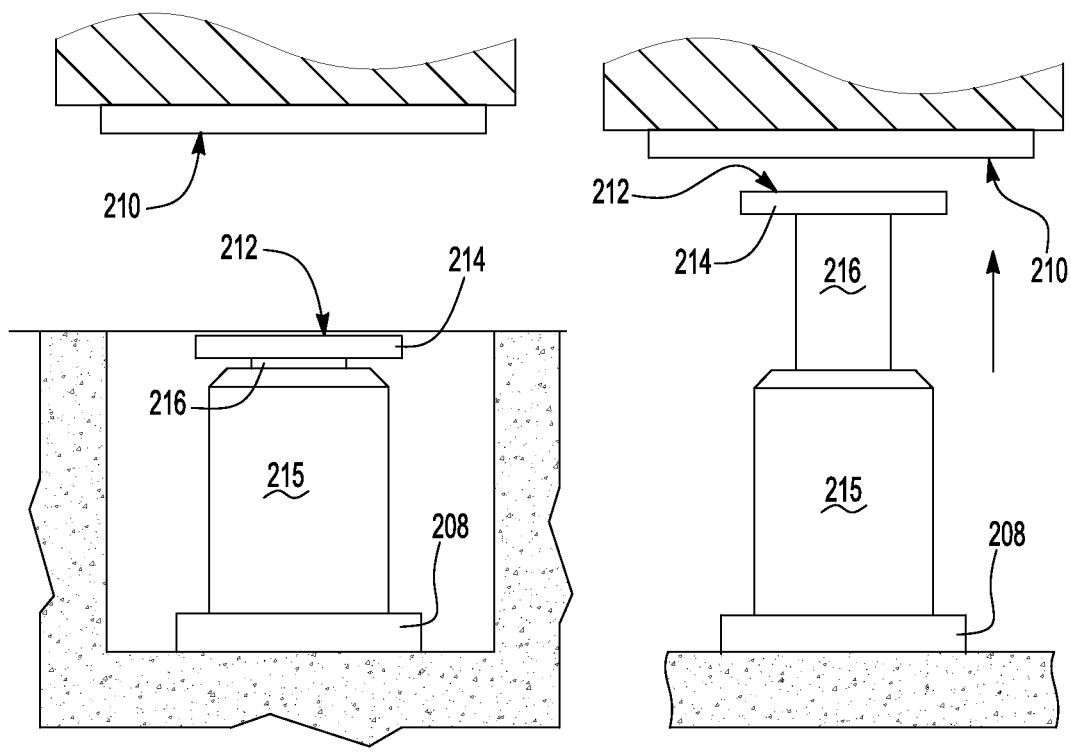
FIGS. 14 and 15 are side views of another charging station in retracted and extended positions respectively.

FIGS. 14-15 show an alternate embodiment for the underbody charging station. FIG. 14 depicts an alternate embodiment of an underbody charger in its retracted position. In FIG. 14, a primary inductive coil 212 is located just beneath the ground on a primary coil pad 214. The primary coil pad 214 is resting on a piston 215. The piston 215 actuates a piston rod 216. In this figure, the piston rod 216 is in its compressed state. The piston 215 is resting on a ground mount 208. The ground mount 208 is secured into the ground.

FIG. 15 depicts another alternate underbody charger in its raised position. In FIG. 15, the piston rod 216 has been raised. The primary coil pad 214 contains the primary charging coil 212. The primary inductive coil 214 has been raised to electrically couple with a secondary inductive coil 210.

While exemplary embodiments are described above, it is not intended that these embodiments describe all possible forms encompassed by the claims. The words used in the specification are words of description rather than limitation, and it is understood that various changes can be made without departing from the spirit and scope of the disclosure and claims. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and could be desirable for particular applications.

What is claimed is:

1. A vehicle charging system comprising:
a base plate including an inclined surface defining at least a portion of a recess; and
an arm arrangement having a base end portion movably attached to the base plate, a vehicle end portion, a ball-roller attached to the base end portion and in contact with the base plate, and a primary charge pad attached to the vehicle end portion, wherein the arm arrangement has a retracted position in which at least a portion of the primary charge pad is disposed within the recess and an extended position in which the primary charge pad is spaced away from the base plate, wherein the ball-roller rolls along the inclined surface as the arm arrangement moves between the retracted and extended positions, and wherein the inclined surface and ball-roller are arranged to cooperate with a force applied to the arm arrangement that causes the arm arrangement to rotate more than a predetermined amount from the extended position such that the arm arrangement continues to move toward the retracted position when the force is removed.

2. The system of claim 1 wherein the base plate further includes a bottom surface adjacent to a bottom of the inclined surface and wherein the inclined and bottom surfaces are arranged to cooperate to restrict movement of the ball-roller when the arm arrangement is in the extended position.

3. The system of claim 2 wherein the base plate further includes a concave surface adjacent to a top of the inclined surface configured to receive the ball-roller when the arm arrangement is in the retracted position.

4. The system of claim 1 wherein the inclined surface and ball-roller are arranged to cooperate to counteract a force applied to the arm arrangement that causes the arm arrangement to rotate less than a predetermined amount from the extended position such that the arm arrangement returns to the extended position when the force is removed.

5. The system of claim 1 wherein the base end portion is movably attached to the base plate such that the ball-roller travels up the inclined surface when the arm arrangement moves from the extended position to the retracted position.

6. The system of claim 1 wherein the inclined surface and ball-roller are arranged to cooperate to resist movement of the arm arrangement from the extended position to the retracted position.

7. A vehicle charging system comprising:
a primary charge pad;
a base including an inclined surface defining at least a portion of a recess; and
an arm arrangement movably attached with the base and the primary charge pad, and including a ball-roller in contact with the base, wherein the arm arrangement has a retracted position in which at least a portion of the primary charge pad is disposed within the recess and an extended position in which the primary charge pad is spaced away from the base, wherein the ball-roller rolls along the inclined surface as the arm arrangement moves between the retracted and extended positions, and wherein the inclined surface and ball-roller are arranged to cooperate with a force applied to the primary charge pad or arm arrangement that causes the arm arrangement to rotate more than a predetermined amount from the extended position such that the arm arrangement continues to move toward the retracted position when the force is removed.

8. The system of claim 7 wherein the base further includes a bottom surface adjacent to a bottom of the inclined surface and wherein the inclined and bottom surfaces are arranged to cooperate to restrict movement of the ball-roller when the arm arrangement is in the extended position.

9. The system of claim 8 wherein the base further includes a concave surface adjacent to a top of the inclined surface configured to receive the ball-roller when the arm arrangement is in the retracted position.

10. The system of claim 7 wherein the inclined surface and ball-roller are arranged to cooperate to counteract a force applied to the primary charge pad or arm arrangement that causes the arm arrangement to rotate less than a predetermined amount from the extended position such that the arm arrangement returns to the extended position when the force is removed.

11. The system of claim 10 wherein an angle of the inclined surface determines the predetermined amount.

12. The system of claim 11 wherein an angle of the inclined surface determines the predetermined amount.

13. The system of claim 7 wherein the arm arrangement is movably attached to the base such that the ball-roller travels up the inclined surface when the arm arrangement moves from the extended position to the retracted position.

14. The system of claim 7 wherein the inclined surface and ball-roller are arranged to cooperate to resist movement of the arm arrangement from the extended position to the retracted position.

15. The system of claim 7, wherein the primary charge pad includes a primary charge coil, further comprising a secondary charge pad including a secondary charge coil, wherein the primary charge coil, when activated, generates an electromagnetic field that couples with the secondary charge coil when the secondary charge pad is in a vicinity of the primary charge pad.

16. A system comprising:
an arm arrangement movably attached with a base and a primary charge pad, and including a ball-roller in contact with the base, the arrangement having a retracted position with the pad being in a recess of the base and an extended position with the pad being spaced away from the base, the ball-roller rolling along an inclined surface of the recess as the arrangement moves between the retracted and extended positions, and the inclined surface and ball-roller being arranged to cooperate with a force applied to the arrangement that causes the arrangement to rotate more than a predetermined amount from the extended position such that the arrangement continues to move toward the retracted position when the force is removed.

* * * * *